UNITED STATES PATENT OFFICE.

PAUL LÉON HULIN, OF CLAVAUX, PAR RIOUPÉROUX, FRANCE.

METHOD OF MAKING HYDROGEN DIOXID.

SPECIFICATION forming part of Letters Patent No. 692,139, dated January 28, 1902.

Application filed July 9, 1901. Serial No. 67,582. (No specimens.)

*To all whom it may concern:*

Be it known that I, PAUL LÉON HULIN, engineer, of Clavaux, par Riouperoux, Isère, Republic of France, have invented Improvements in the Preparation of Oxygenated Water, of which the following is a full, clear, and exact description.

My invention relates to a process for the preparation of oxygenated water on a commercial scale by means of sodium dioxid.

Oxygenated water is a solution of hydrogen dioxid in pure water, ($H_2O_2 + n$Aq.) It generally contains from ten to fifteen volumes of active oxygen, and it is requisite that it should neither contain alkalies nor salts in solution in sensible proportion. In short, for most uses it should consist of a solution of $H_2O_2$ practically free from foreign elements. It is this condition more especially which has hitherto restricted the direct use of sodium dioxid for the preparation of oxygenated water, as this substance leaves in the solution either caustic soda or a salt of soda, and such a preparation is not suited for the purpose for which it is to be used, as it does not possess the qualities and stability required of oxygenated water.

The process hereinafter described has for its object the manufacture of oxygenated water upon a commercial scale by the direct employment of sodium dioxid.

The process consists in dissolving, with the necessary precautions, sodium dioxid ($Na_2O_2$) in a solution of hydrofluoric acid maintained at a sufficiently low temperature, whereby oxygenated water and soluble fluorid of sodium are formed.

$$Na_2O_2 + 2HFl + nH_2O = 2NaFl + H_2O_2 + nH_2O.$$

This solution is then treated with a suitable proportion of aluminium fluorid under such conditions as to enter into combination with the sodium fluorid. An insoluble double fluorid of aluminium and sodium or artificial cryolite is thus formed, the salt of sodium which remained in the solution of oxygenated water being eliminated in this compound, the precipitate being separated by filtration and oxygenated water being obtained practically free from objectionable compounds.

The known rules, precautions, and care in the preparation of oxygenated water of various degrees of concentration are of course to be observed in operating by this process.

The process may be carried out in various ways, and I will describe some of the modifications which may be adopted.

First. The solution of hydrofluoric acid previously prepared may already contain aluminium fluorid in solution, which represents the acid termed "hydrofluo-aluminic" acid,

$$(Al_2Fl_6 + 6HFl + nH_2O,)$$

and it is then only necessary to add the sodium dioxid to this solution with the necessary precautions, the insoluble cryolite being then formed without other addition.

Second. To the solution may be added twice the quantity of hydrofluoric acid necessary for the saturation of the sodium dioxid in solution, a solution being thus obtained containing $NaFl + HFl + H_2O_2 + nH_2O$. Aluminium hydrate is then added, which becomes transformed into aluminium fluorid and insoluble cryolite. In this way the aluminium fluorid is formed in the solution itself instead of being prepared previously. This result may also be obtained by in the first place adding aluminium hydrate to the neutral solution and then adding hydrofluoric acid, the alumina being transformed into aluminium fluorid on contact with the sodium fluorid, whereupon insoluble cryolite is formed.

Third. It will be evident that it is not necessary to convert the whole of the sodium fluorid into insoluble double fluorid, the function of the aluminium fluorid in my process being to remove that which could not be eliminated by known means. The sodium fluorid in excess which cannot be dissolved may first be allowed to settle, and so extracted, the portion which remains in solution being afterward precipitated by the aluminium fluorid. Furthermore, when hydrofluoric acid is added to the neutral solution of oxygenated water and sodium fluorid with a view to produce aluminium fluorid by the addition of aluminium hydrate the precipitation of fresh quantities of sodium fluorid is brought about, especially if the temperature be reduced at the same time.

It will be understood that in all these modifications the acid or materials necessary may be added in several stages, that the reactions may be repeated or varied in their order, and that successive saturations with intermediate precipitations and filtrations may be effected, and so on. Other more or less practical modifications may also be made—as, for example, the sodium dioxid and the aluminium fluorid or the alumina may be mixed and this mixture be immersed in the hydrofluoric-acid solution. The sodium dioxid may also be dissolved in a solution of aluminium fluorid, producing a mixed precipitate of double fluorid and alumina, &c. The common aluminium fluorid as it is obtained by saturating hydrofluoric acid with aluminium is insoluble in water; but an aqueous solution of aluminium fluorid may be prepared by the method of St. Claire-Deville—that is, by attacking the aluminium or kaolin by hydrofluosilicic acid. By using an excess of the aluminium or kaolin the reaction gives a precipitate of silica produced by the decomposition of the silicium fluorid, and it leaves a solution of aluminium fluorid. According to the opinion of St. Claire-Deville the soluble aluminium fluorid produced under such conditions will be a hydrated variety, ($Al_2Fl_6.7H_2O$.) It is sometimes preferable in practice in order to facilitate the operation and avoid trouble to sacrifice the purity of the insoluble double fluorid and to admit an excess of aluminium fluorid or of alumina or of some insoluble compounds hereinafter mentioned.

By combining in various manners the stages and modifications of my process I may vary to a certain degree the nature or the proportions of the utilized agents or of the fluorated by-products. Thus when I want to obtain the minimum of cryolite I preferably proceed as follows: I saturate in one or more operations the solution of hydrofluoric acid with sodium dioxid by stirring and maintaining at a low temperature, separate the excess of sodium fluorid which naturally deposits, and add hydrofluoric acid in such a quantity as to have at least and as exactly as possible one molecule of hydrofluoric acid for one molecule of alkaline fluorid remaining in solution. The addition of the acid generally gives a precipitation of sodium fluorid in the form of granular crystals, mostly composed of fluorid hydrosulfate, separate this new precipitate and obtain a solution of oxygenated water containing not more than twenty to twenty-five grams of NaFl per liter, with the hydrofluoric acid in excess, (molecule of HFl to molecule of NaFl.) I then add gelatinous alumina in order to saturate the whole of the acid and form the precipitate of cryolite, which I preferable separate by filtering. An operation which is brought about in this way gives as by-products neutral sodium fluorid, acid fluorid, (fluorid hydrofluate,) and cryolite. When the solution is carefully filtered, the same gives an oxygenated water which is practically free of salts and objectionable matters. If I wish to obtain more cryolite, I leave in the solution the whole or part of the precipitates of sodium fluorid which have been obtained successively before the action of the aluminium fluorid, and I stir when the latter begins to act.

The process which has just been exposed remains the same if I add first alumina in excess to the neutral solution of alkaline fluorid and if I then add, gradually and by stirring, a corresponding quantity of hydrofluoric acid. In such case there is advantage to secure the complete conversion of the alumina by means of a moderate excess of hydrofluoric acid, which is then saturated on its turn by an excess of gelatinous alumina. I also vary the use of hydrofluo-aluminic acid ($Al_2Fl_6.6HFl$) by adding such compound to the solution of oxygenated water and of sodium fluorid in such a quantity that the whole of the fluor contained therein will be at least equal to the fluor of the sodium fluorid contained in the oxygenated solution. I then saturate the hydrofluoric acid with gelatinous alumina, as before, and I also render insoluble the sodium fluorid in the form of artificial cryolite.

The hereinbefore-described operations are sometimes followed by a treatment with baryta in aqueous solution or lime-water which is added at will and according to circumstances in order to elminate any sulfuric acid which the gelatinous alumina may contain and to destroy in the form of insoluble residues the reagents which may be in excess and in solution.

When it is not desired to elminate the whole of the sodium salt contained in the oxygenated solution, I may after having separated as much as possible of the sodium fluorid treat with a soluble salt of aluminium, such as the chlorid, sulfate, or fluosilicate, &c. The fluor is thus elminated, and a fresh quantity of sodic salt is rendered insoluble and then separated. There then remains in the solution a little sulfate or chlorid or fluosilicate of sodium. That which remains of the latter after filtration may be converted into chlorid by the addition of barium chlorid, so as to form less soluble barium fluosilicate which is separated.

It is evident that the details of operation and the means enabling to put my process into practice are too numerous to be all described. The principles and the examples I have exposed enable in each particular case to apply my process in order to obtain an accessory result.

I claim—

1. The process herein described of producing an aqueous solution of hydrogen dioxid, which consists in decomposing sodium dioxid by hydrofluoric acid in the presence of water to form hydrogen dioxid, and converting the sodium into an insoluble precipitate of cryolite by aluminium fluorid, as set forth.

2. The process herein described of producing an aqueous solution of hydrogen dioxid, which consists in decomposing sodium dioxid with an excess of hydrofluoric acid, then adding aluminium hydrate thereby forming aluminium fluorid in quantities sufficient to combine with the sodium fluorid to completely precipitate it as cryolite, substantially as described.

3. The process herein described of producing an aqueous solution of hydrogen dioxid, which consists in decomposing sodium dioxid by hydrofluoric acid in the presence of water, converting the sodium into an insoluble precipitate, and finally adding an alkaline earth, such as baryta or lime, to render insoluble the reagents that may be in excess as set forth.

The foregoing specification of my improvements in the preparation of oxygenated water signed by me this 21st day of June, 1901.

PAUL LÉON HULIN.

Witnesses:
  RIGIO JOYO, Fils,
  RALPH CLEWELL SUPER.